United States Patent
Watson (10) Patent No.: US 8,269,691 B2
(45) Date of Patent: Sep. 18, 2012

(54) NETWORKED COMPUTER GRAPHICS RENDERING SYSTEM WITH MULTIPLE DISPLAYS FOR DISPLAYING MULTIPLE VIEWING FRUSTUMS

(75) Inventor: Brian Watson, Burlingame, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 545 days.

(21) Appl. No.: 12/493,008

(22) Filed: Jun. 26, 2009

(65) Prior Publication Data

US 2010/0328346 A1  Dec. 30, 2010

(51) Int. Cl.
G09G 5/00  (2006.01)

(52) U.S. Cl. ............ 345/1.1; 345/1.2; 345/1.3; 345/2.1; 345/2.2; 345/2.3

(58) Field of Classification Search .................. 345/1.1, 345/1.2, 1.3, 2.1, 2.2, 2.3
See application file for complete search history.

(56) References Cited

U.S. PATENT DOCUMENTS

| | | | |
|---|---|---|---|
| 4,787,051 A | 11/1988 | Olson | |
| 4,843,568 A | 6/1989 | Krueger et al. | |
| 5,128,671 A | 7/1992 | Thomas, Jr. | |
| 5,275,565 A * | 1/1994 | Moncrief | 434/29 |
| 5,528,265 A | 6/1996 | Harrison | |
| 5,923,307 A | 7/1999 | Hogle, IV | |
| 5,926,153 A | 7/1999 | Ohishi et al. | |
| 6,157,368 A | 12/2000 | Faeger | |
| 6,375,572 B1 | 4/2002 | Masuyama et al. | |
| 6,804,406 B1 | 10/2004 | Chen | |
| 7,532,196 B2 * | 5/2009 | Hinckley | 345/156 |
| 7,942,530 B2 | 5/2011 | Majumder et al. | |
| 8,159,416 B1 * | 4/2012 | Yum et al. | 345/8 |
| 2002/0154145 A1 * | 10/2002 | Isakovic et al. | 345/643 |
| 2002/0167459 A1 | 11/2002 | Baudisch et al. | |
| 2004/0085256 A1 | 5/2004 | Hereld et al. | |
| 2004/0125044 A1 * | 7/2004 | Suzuki | 345/1.1 |
| 2004/0212589 A1 | 10/2004 | Hall et al. | |
| 2005/0206857 A1 | 9/2005 | Yamada | |
| 2006/0001593 A1 | 1/2006 | Baudisch | |
| 2006/0033712 A1 | 2/2006 | Baudisch et al. | |
| 2006/0268013 A1 * | 11/2006 | Miles | 345/635 |
| 2007/0263079 A1 | 11/2007 | Graham et al. | |
| 2007/0285342 A1 | 12/2007 | Morikawa et al. | |
| 2008/0117290 A1 | 5/2008 | Mazza | |
| 2009/0327418 A1 | 12/2009 | Zhang et al. | |
| 2010/0053164 A1 * | 3/2010 | Imai et al. | 345/427 |

OTHER PUBLICATIONS

International Search Report and Written Opinion for International Patent Application No. PCT/US10/39371 Mailed Aug. 17, 2010, 10 pages.

(Continued)

*Primary Examiner* — Jeffrey Chow
(74) *Attorney, Agent, or Firm* — Blakely, Sokoloff, Taylor & Zafman (57) ABSTRACT

To render graphics on multiple display devices, multiple computing platforms are networked and each computing platform separately executes an application rendering the graphics for a subset of the multiple display devices. A server including a first display device and a first computing platform generates a world space and renders from the generated world space a first viewing frustum for display on the first display device and a client coupled to the server receives a transmission of the world space position and renders a second viewing frustum for display on a second display device.

20 Claims, 7 Drawing Sheets

OTHER PUBLICATIONS

"Optimum Array Processing (Detection, Estimation, and Modulation Theory, Part IV)," Chapter 6.13 "Broadband Beamformers," pp. 621-667 by Van Trees, Mar. 22, 2002.

Bolt, R.A., "Put-that-there: voice and gesture at the graphics interface", Computer Graphics, vol. 14, No. 3 (ACM SIGGRAPH Conference Proceedings) Jul. 1980, pp. 262 270.

DeWitt, Thomas and Edelstein, Phil, "Pantomation: A System for Position Tracking," Proceedings of the 2nd Symposium on Small Computers in the Arts, Oct. 1982, pp. 61-69.

Dietrich. "Real Time Animation Techniques with Microcomputers," 1982, 1 pg.

International Search Report and Written Opinion for International Patent Application No. PCT/US2010/38199, Mailed Nov. 15, 2011, 7 pages.

International Preliminary Report on Patentability for International Patent Application No. PCT/US2010/038199/, Mailed Jan. 12, 2012, 6 pages.

International Preliminary Report on Patentability for International Patent Application No. PCT/US2010/039371, Mailed Jan. 12, 2012, 8 pages.

Non-Final Office Action for U.S. Appl. No. 12/492,883, Mailed Nov. 29, 2011, 13 pages.

Non-Final Office Action for U.S. Appl. No. 12/493,027, Mailed Nov. 28, 2011, 22 pages.

* cited by examiner

NETWORKED COMPUTER GRAPHICS RENDERING SYSTEM WITH MULTIPLE DISPLAYS FOR DISPLAYING MULTIPLE VIEWING FRUSTUMS

RELATED APPLICATIONS

This application is related to co-pending U.S. patent application Ser. No. 12/492,883, entitled, "Networked Computer Graphics Rendering System with Multiple Displays", filed on Jun. 26, 2009 and entitled, "Configuration of Display and Audio Parameters for Computer Graphics Rendering System Having Multiple Displays", filed on Jun. 26, 2009.

FIELD OF THE INVENTION

The present invention relates generally to computer graphics rendering systems, and more particularly to graphics rendering systems with multiple displays.

DESCRIPTION OF THE RELATED ART

Computer graphics applications continue to improve the realism of rendered scenes to increase the entertainment or simulation value of computer game or CAD applications. An effect known as "immersion" can contribute to the realism of rendered scenes. Immersion refers to moving the perspective of the graphics application user from that of an outsider looking into scene to a perspective of being part of the scene. Immersion, however, is difficult to achieve in a resource-efficient manner within the hardware and processing limitations of a most popular computing platforms. For example, many first and third person computer games render a wide field of view (FOV) of about 60° for display on a display device. While increasing the FOV reduces a feeling a "tunnel vision," the wide FOV yields a "fish-eyed" view, sacrifices detail, and fails to achieve the immersion effect.

A graphics application may also require a platform with a high computing power, for example with one or more multi-core central processing unit (CPU) and a plurality of graphics processing units (GPUs) downstream of the CPU. For such a graphics platform, the CPU typically generates a single graphical realm model which is then processed with each GPU performing rendering passes to separately drive one of a plurality of display devices connected to the platform. This method however, is extremely hardware intensive, so the graphics platform market is small and as such few application titles authored to take advantage of such a platform's capabilities.

BRIEF DESCRIPTION OF THE DRAWINGS

Embodiments of the invention are particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

For clarity of illustration, elements illustrated in the figures have not necessarily been drawn to scale. For example, the dimensions of some of the elements may be exaggerated relative to other elements. Further, where considered appropriate, reference numerals have been repeated among the figures to indicate corresponding or analogous elements.

DETAILED DESCRIPTION

Described herein is a system having multiple displays for rendering and displaying graphics and a method for rendering and displaying graphics on the system. In the following detailed description, numerous specific details are set forth in order to provide a thorough understanding of embodiments of the invention. However, it will be understood by those skilled in the art that other embodiments may be practiced without these specific details. In other instances, well-known methods, procedures, components and circuits have not been described in detail so as not to obscure the present invention. Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of actions or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated or otherwise as apparent from the following discussion, it is appreciated that throughout the description, discussions utilizing terms such as "processing", "computing", "converting", "reconciling", "determining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. In one embodiment, the apparatus for performing the operations herein includes a game console (e.g., a Sony Playstation®, a Nintendo Wii®, a Microsoft Xbox®, etc.). A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, or any type of media suitable for storing electronic instructions.

The terms "coupled" and "connected," along with their derivatives, may be used herein to describe structural relationships between components of the apparatus for performing the operations herein. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g., as in a cause an effect relationship).

Figure 1:
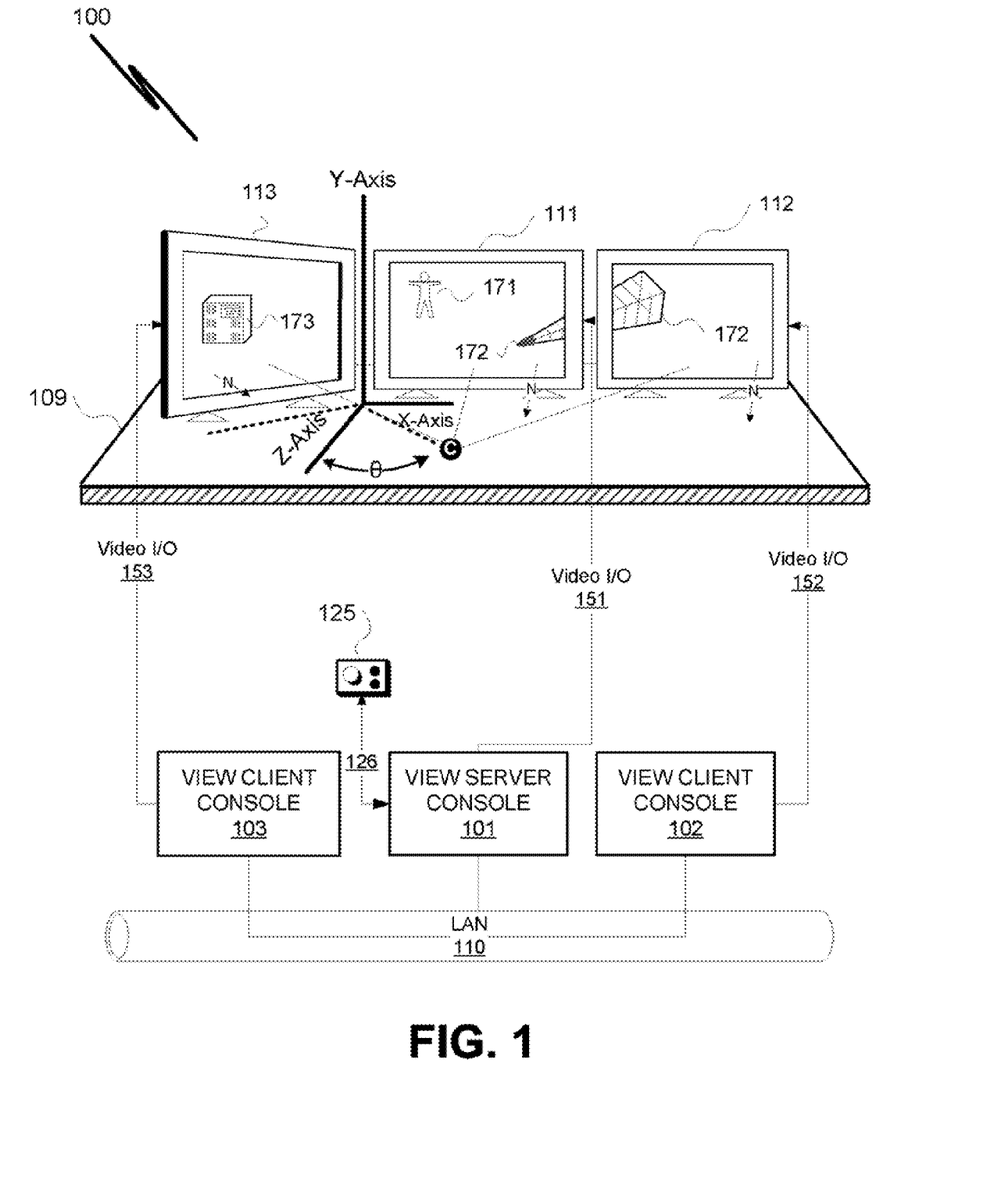
FIG. 1 illustrates a schematic diagram of multiple display device graphics rendering system, in accordance with an embodiment of the present invention.

In an embodiment, a multiple display graphics rendering system includes a plurality of computing platforms with each computing platform to generate and render graphics for display on a display device of the system. FIG. 1 illustrates a perspective view of a multiple display graphics rendering system 100, in accordance with one embodiment of the present invention where each computing platform is a game console. In alternative embodiments however, the depicted game consoles may each be replaced by any conventional computer having a programmable processor. As depicted, the system 100 includes three game consoles, a view server console 101 and view client consoles 102 and 103, although any number of consoles may be included in a system.

In an embodiment, each computing platform in a multiple display graphics rendering system is connected to a single display device. For such embodiments, a one-to-one ratio of computing platforms to display devices is maintained regardless of the number of computing platforms included in a system. Each display device in the system is to display graphics generated and rendered by the computing platform to which it is coupled. In an alternative embodiment however, a computing platform may be connected to more than one display device, whereby the computing platform would generate and render graphics for the two or more connected display devices. In the particular embodiment depicted in FIG. 2, the view server console 101 is coupled to a view server display device 111 by video data I/O link 151. The view server display device 111 is therefore to display graphical output, such as graphics objects 171 and 172, generated by the view server console 101. The view server display device 111 may be of any display technology known in the art, such as, but not limited to, an LCD, a plasma display, a projection display, a cathode ray tube (CRT). Similarly, the video data I/O link 151 may utilize any technology known in the art for transmitting video, such as, but not limited to, component video, S-video, composite video a High Definition Multimedia Interface (HDMI). The view client consoles 102 and 103 are each similarly coupled through a video data I/O link 152 or 153 to a view client display device, 112 or 113, respectively. The view client display device 112 displays graphical output, such as graphics object 172, generated by the view client console 102 while the view client display device 113 displays graphical output, such as graphics object 173, generated by the view client console 103.

In an embodiment, the display devices in a multiple display graphics rendering system have a known physical position with respect to each other. As illustrated in FIG. 1, each of the view client display devices 112-113 is disposed on a table 109 with the display devices having a linear position and an orientation (i.e. angular position) relative to a reference coordinate system of the view server display device 111. In the exemplary embodiment depicted, view client display device 113 has an angular position rotated by θ about the Y-Axis of the reference coordinate system of the view server display device 111 so that the vector N normal to the screen of the display devices 111 and 113 converge at a same reference center, C, with an angular position offset of approximately 45°. View client display device 112 also has a linear position, along the X-Axis of the reference coordinate system of the view server display device 111. Because the view client display device 112 is not also rotated about the Y-Axis, the vector N normal to the screen does not coverage at the point F. Nonetheless, a ray from the reference C may be made to the centerline of the view client display device 112 to define the position of the view client display device 112 relative to view server display device 111 in terms of a physical angular position offset (i.e. viewing angle offset). In further embodiments, display devices may also be rotated about one or more of the X-Axis and Z-Axis of the reference coordinate system. For example, a view client display disposed above the view server display device 111 may be tilted down with an angular position rotated about the X-Axis of the reference coordinate system.

In an embodiment, each of the computing platforms in a multiple display graphics rendering system is coupled together over a network of communication links. The network may be any network known in the art capable of providing sufficiently high bandwidth to achieve good performance of the graphics rendering methods described elsewhere herein which update a view state between about 20 and 100 times every second, for example. In the exemplary embodiment depicted in FIG. 1, the network is a local area network (LAN) 110. LAN 110 may be any conventional LAN common to the art, such as, but not limited to one of the Ethernet family of frame-based short haul computer networking technologies.

In one embodiment, the only computing platforms which are physical nodes on the LAN 110 are those actively generated and rendering one of the multiple displays of the system 100. In one such embodiment, the view server and the view clients all share a same local high speed network switch. Such an embodiment is therefore exclusive of wide area networks (WAN) which include many physical nodes merely forwarding and not processing data packets specific to the multiple display graphics rendering system. Generally, most contemporary WANs offer insufficient bandwidth (allowing perhaps only less than 10 view state updates every second) to achieve good performance of the graphics rendering methods described herein.

In an embodiment, at least one of the computing platforms in a multiple display graphics rendering system is coupled to a controller designed to be used by system user to control the graphics displayed as a view on at least one of the multiple display devices. In a particular embodiment, only one computing platform in a multiple display graphics rendering system is coupled to a controller and that controller controls the graphics displayed as separate views on all of the display devices in the graphics rendering system. For example, as depicted in FIG. 1, view server console 101 is coupled to the controller 125 through the server controller data I/O link 126. The controller 125 may be any pointing device, such as, but not limited to, a conventional game controller having a joystick and the server controller data I/O link 126 may be any conventional wired or wireless link.

Figure 2:
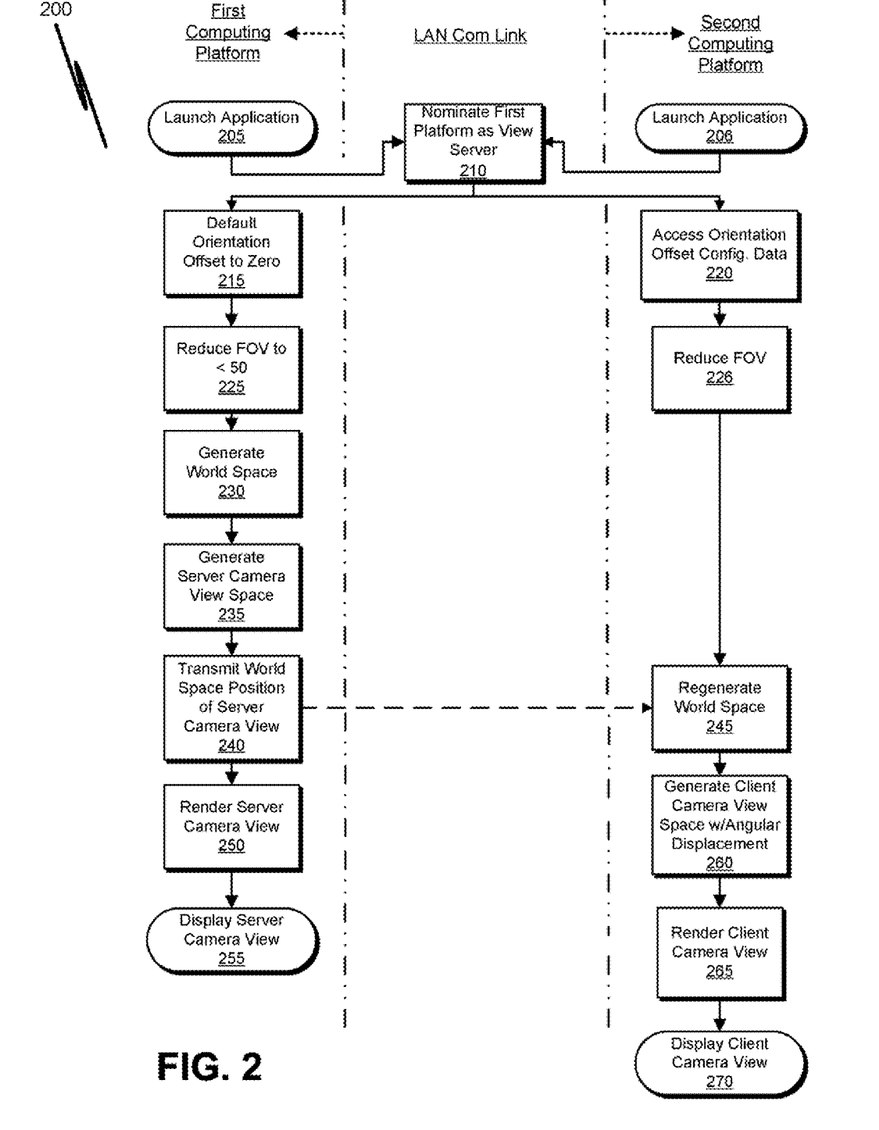
FIG. 2 illustrates flow diagram illustrating an exemplary method of rendering graphics with a plurality of computing platforms and display devices, in accordance with an embodiment of the present invention.

FIG. 2 illustrates flow diagram illustrating an exemplary method 200 of rendering graphics with a plurality of computing platforms and display devices, such as provided in the multiple display graphics rendering system 100. Method 200 begins with each of a first, second, and nth computing platform connected by a communication link each launching an application configured to establish an intra-system server-client relationship. As user herein, "intra-system" refers to a view client-server relationship which spans only the computing platforms making up a multiple display graphics rendering system.

At operation 205, a first application is launched on the first computing platform. Generally, the first application launched may be any type of graphics intensive computer application known in the art, such as, but not limited to, computer game applications, CAD applications, video editing applications, and the like. In a particular embodiment, the application launched is a first or third person 3D computer game application, such as, but not limit to, the third person 3D game SOCOM™ published by Sony Computer Entertainment, Inc. At operation 206, a second application is launched on the second computing platform. The second application launched may be of any type as that described for the first application. In a particular embodiment, the second application launched on the second computing platform is the same application as the first application launched on the first computing platform so that both platforms are separately executing a same application (e.g., SOCOM™).

With the first and second applications executing on the first and second computing platforms, at operation 210, the first computing platform is nominated as a view server and the second platform becomes a view client. A similar nomination of one view server may be made in systems having three or more computing platforms, whereby all remaining platforms become client platforms. The nomination of the first computing platform may be made by configuration routine (either performed automatically or manually, requiring user input), that nominates based on one or more of a comparison of processing capability of the first and second computing platforms, a physical relationship between display devices coupled to the computing platforms, or a comparison of display device characteristics. For example, a configuration routine may determine which system display device has a larger display area or higher display resolution and nominate the computing platform coupled to that display device to be the view server. As another example, a configuration setting may be set to indicate which display a user desires to be a center of a field of view (FOV). As another example, a computing platform having a higher computing power, such as a Sony® Playstation 3® computing platform may be nominated a view server over a Sony® Playstation 2® computing platform of the same system.

For the exemplary method 200, at operation 215, the view server sets a view angular position offset (i.e. view orientation offset) to a default of zero. With a view angular position offset of zero, a camera view rendered by the view server defaults to a camera view rendered by the application when run on a computing platform in absence of an intra-system view client-server relationship (i.e., a single computing platform). At operation 220, however, the view client sets a view orientation offset to be non-zero. In one such embodiment, a configuration setting associated with the view orientation offset is accessed from a storage location on either the view client or the view server. In an embodiment, the view orientation offset is view client-specific and is predetermined based on the physical orientation offset between the display device coupled to the view server and the display device coupled to a particular view client. For example, referring back to FIG. 1, the view orientation offset for the view client console 103 is set to be approximately equal to the physical orientation offset of θ between the view client display device 113 and the view server display device 111. The view orientation offset for the view client console 102 is similarly set to be approximately equal to the physical orientation offset between the view client display device 112 and the view server display device 111. In an embodiment, the view orientation offset is predetermined based on a calibration routine run on either or both the view server and view client to deduce the physical relative orientation between display devices.

Method 200 proceeds to operation 225 where a FOV value for the server is reduced to less than 50° in response to being networked with another platform driving another display device. The greater FOV provided across the plurality of display devices may thereby enable a reduction in the fish-eye effect on the view server display while the secondary (and tertiary, etc.) view client display devices placed proximate to the view server display device combine to provide a user with an immersive experience. Similarly, at operation 226, a FOV value of the view client may also be reduced to less than 50° and communicated to the view server. In a particular embodiment, each of the view server and view client have a FOV value set to between 20° and 50° with an exemplary embodiment having both the view server and the view client FOV value set to approximately 25°.

On the view server side, the view server executes a geometry pipeline in operations 230, 235 and 250 to display a server camera view at operation 255 on a view server display device. On the view client side, each view client executes a geometry pipeline in operations 245, 260 and 265 to display a client camera view at operation 270 on a view client display device. In an embodiment, execution of these geometry pipelines by the view server and view client(s) is coordinated based internal view state information transmitted by the view server and based on one or more of the view orientation offset and FOV value to collectively render and display graphics spanning a plurality of display devices at substantially the same time.

During the execution of the first application on the view server, input vertex data associated with input received from a view control input device, such as the controller 125, is converted into model space using any technique conventional in the art. At operation 230, the view server generates a world space from a model space. Generally, a "space" is a coordinate system for positioning objects relative to a frame of reference. In a left-handed system, the Z-axis (depth-related axis) extends away from the user into the scene, consistent with the reference coordinate depicted in FIG. 1. A model space is a frame of reference that defines a modeled object's vertices relative to an origin local to that model. Each object rendered in a world scene, such as graphics objects 171, 172 and 173, has a corresponding model with each model including a plurality of vertices in model space. Thus, if the model pertained to graphics object 171, the model space may generate vertices relative to an origin located at the center of the human form. To generate a world space, a global origin is defined as common point of reference for determining different locations in the scene and all modeled object vertices are defined relative to that global origin.

Figure 3:
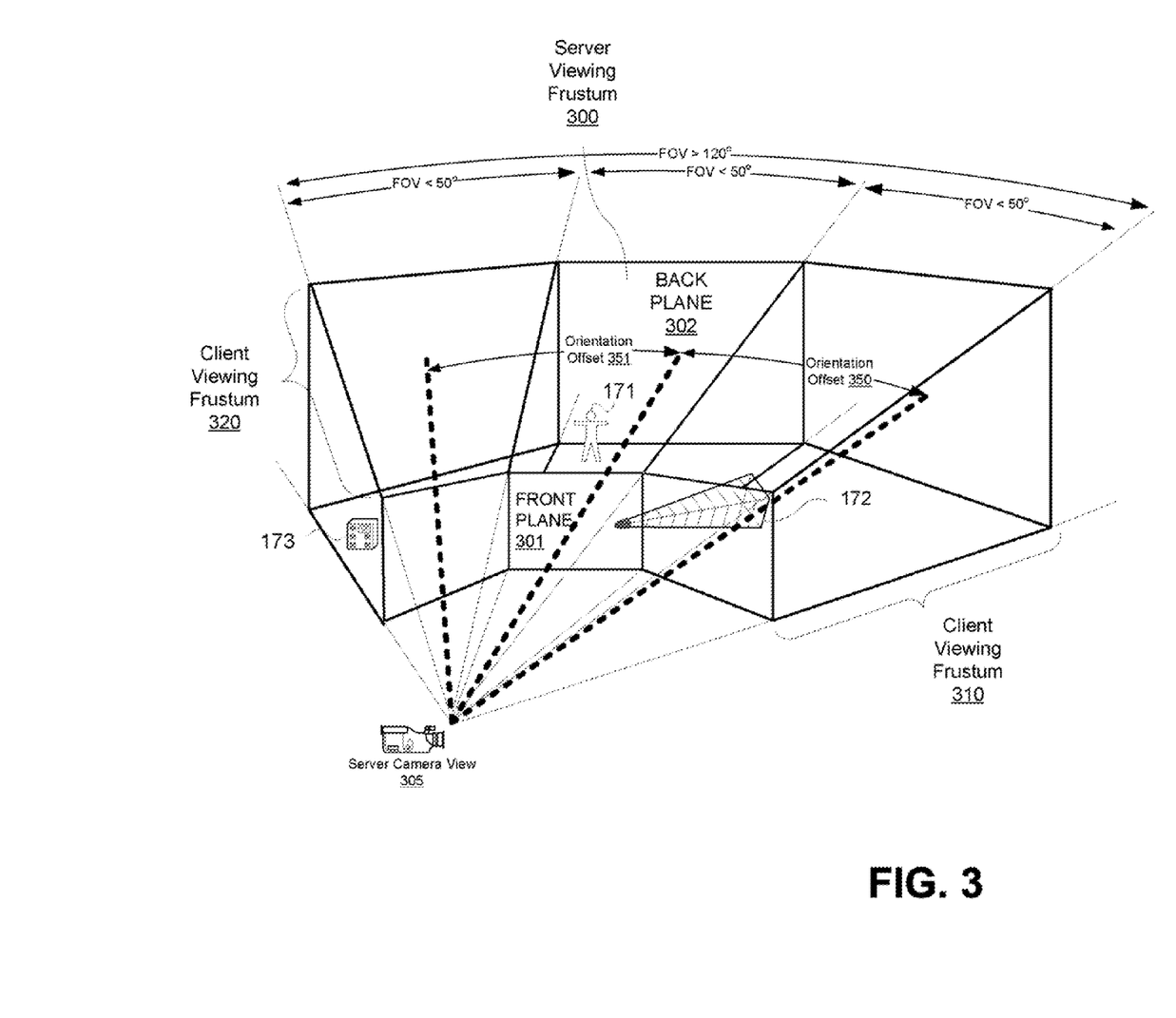
FIG. 3 illustrates a plurality of camera viewing frustums each generated by a computing platform and each angularly offset for display by multiple display devices, in accordance with one embodiment of the present invention.

At operation 235, the world space generated at operation 230 is transformed into a server view space or "server viewing frustum." FIG. 3 depicts an exemplary server viewing frustum 300 corresponding to the system 100 depicted in FIG. 1. As illustrated, the server viewing frustum 300 has a frame of reference in which the viewer is at the origin, looking in the direction of the positive Z-axis into the conical viewing volume clipped by a front plane 301 and the back plane 302. The outer boundaries of the server viewing frustum 300 converge at the server camera 305. Accordingly, the server viewing frustum 300 assumes a truncated pyramidal shape. The server camera 305 defines the vantage point in world space from which a viewer observes the world scene. Accordingly, the world space coordinates are relocated and oriented to a world space position vantage point to provide the server viewing frustum 300 at the server camera 305.

At operation 240, the view server scans through its internal state of all world-space objects and transmits the state of each object in a manner that allows all of the view clients to accurately represent the same world scene. For example, if the view server is executing a game application, internal game state information may be broadcast to system view clients. The transport mechanism may be unreliable delivery protocol (UDP) or a transmission control protocol (TCP), which may depend on the choice of the title. UDP transport will have additional state information preserved by the view server console so that if an update packet has been lost, the information can be retransmitted with more up to date information. While TCP can also be used, additional latency variation may be expected. TCP, however, is reliable so that no application interaction is required to confirm data delivery. On a local network, such as LAN 110, it is unlikely that latency will be an issue especially when the view server/client consoles share a local high speed network switch.

In an embodiment, a view state indicative of a world space position and world space orientation of the server camera 305 is transmitted over the communication link to the view client(s). In other words, the server camera view matrix is communicated to the view clients. In one such an embodiment, the view server multicasts game view state information between about 20 and 100 times/second. Object animation information may further be communicated as part of the internal state data transmitted by the view server. Additional information may also be sent by the view server to synchronize locally-generated objects (e.g., objects to be generated by the view client consoles) such as particle effects. For a conventional online-game configuration, such locally-generated objects may be only roughly approximated as it is unnecessary for a remote player to see such effects completely synchronized. However, in embodiments of the present invention, a close synchronization of locally-generated objects is achieved based on view state information sent by the view server to advantageously provide the most desirable view to a system user.

At operation 245, a view client receives the transmitted state information and generates a substantially same world space as that generated by the view server. In other words, the view client regenerates the world space to render a secondary view of the same world scene, replicating graphics objects generated by the view server in response to each view state update received. In an embodiment, this secondary view has a vantage point at the server camera 305. As such, the server and client share a common camera as established by the view server and communicated to the view client. The view client may then employ the view orientation offset determined at operation 220 to angularly offset or rotate the client viewing frustum from the world space orientation so that the client viewing frustum does not overlap the server viewing frustum. In this manner, each client-specific view orientation is applied to the received server state information to render a client view dependent on the server view.

For example, as depicted in FIG. 3, a client viewing frustum 310 is generated by a view client based on received server view state information and the view orientation offset specific to the client to have a view orientation offset 350 from the Z-AXIS central to the server viewing frustum 300 (as defined per the world space orientation). The client viewing frustum 310 is offset to be adjacent and to the right of the server viewing frustum 300. The graphics object 172 is replicated by the view client and a portion of the graphics object 172 outside of the server viewing frustum 300 is rendered. The portion of the graphics object 172 within the client viewing frustum 310 may be further dependent on the client FOV value from operation 226. As further shown in FIG. 3, another view client, also receiving the broadcast view state information from the view server, generates a third client viewing frustum 320 having a view orientation offset 351 from the server viewing frustum 300. The client viewing frustum 320 is offset to be adjacent and to the left of the server viewing frustum 300 to render the graphics object 173 (generated by the server as part of the world space and communicated to the client) but beyond the server viewing frustum 300.

In one embodiment, the viewing frustums 300-320 each have a FOV less than 50°, for example 25°. The a view orientation offset may be set to less than twice the FOV to provide a continuous FOV across the view server and view client display devices to accommodate physical spacing between adjacent display devices (caused by display device bezel, etc.). For example, where the physical orientation offset between view server display device 111 and view client display device 112 is between 40 and 50°, the view orientation offset may be set to approximately 40° for a 25° FOV in each display. In other embodiments, the view orientation offset may be greater than or equal to twice the display FOV such that adjacent viewing frustums are spaced apart and the FOV across the view server and view client displays is discontinuous. Objects in world space may then be "hidden" from view in the region between display devices.

With the view orientation offset appropriately predetermined, the view server and view client(s) each render viewing frustums of a common world space to form a mesh of view spaces of the same world scene. In this manner, multiple displays are coordinated with rendering performed by separate computing platforms. The computing power of each platform may thereby be lessened. Furthermore, any application title authored for a stand-alone execution on a single computing platform having a single display, such as view server console 101, may be readily scaled to support a plurality of display devices with little application-specific coding. As such, a supplier of the computing platform may provide a common library of functions providing multiple-display graphics rendering support which may then be incorporated by any developer of applications for the computing platform. Titles may then merely be authored to have a greater or lesser number of graphics objects as a function of the FOV provided by the multiple display graphics rendering system. For example, an application title executing in a single platform or "stand-alone" mode may generate graphics objects with a bias for the 60° field of FOV from the camera. The same application title executing in a multiple display system would increase the graphics object generation bias to encompass a greater FOV based on the cumulative FOV available as determined through the number of consoles on the network and FOV configuration settings for each console.

After generation of the view spaces corresponding to each display device, additional matrix manipulations may be performed by the view server and view client(s) to render views on their respective display device. For example, server viewing frustum 300 may be rendered to give depth to a scene whereby object 171 may be made to appear smaller than object 172 based on the relative position of the objects in the server viewing frustum 300, as known in the art. Additional matrix operations may then be performed to generate a server screen space with a frame of reference in which coordinates are related directly to screen X-Y locations in a frame buffer, to be displayed on a server display device at operation 255. For example, the server viewing frustum 300 may be rendered into a server screen space including the graphics object 171 and a portion of the graphics object 172 within the server viewing frustum 300, as depicted in FIG. 1. At operation 270, similar rendering activities may be performed by the view client(s) to display client screen spaces at substantially the same time as the server screen space is rendered so that a combined view across displays of the system are most nearly in lock-step. For example, the client viewing frustum 310 may be rendered into a client screen space including a portion of the graphics object 172 within the client viewing frustum 310, as determined by the FOV and orientation offset 350 at substantially the same time the viewing frustum 300 is rendered into a server screen space including the portion of the graphics object 172 within the server viewing frustum, as further depicted in FIG. 1.

At operation 260, any changes to the input matrix received from a controller coupled to the view server triggers an update in the server view space which is then transmitted at operation 240. In response, a view client re-renders a corresponding client view space to reflect the input matrix change. As such, in one embodiment, only the view server includes a view control input device, such as controller 125. A view client computing platform assuming a role of rendering a secondary view of the world scene as controlled through the view server need not include any controller. Because the view client systems are in a passive rendering mode, in certain embodiments intra-system network communication may be substantially unidirectional with the view server performing broadcasts to downstream view clients and view clients also not communicating to each other. Network bandwidth may therefore be substantially dedicated to the view server to allow high internal state refresh rates across all platforms in a system.

Figure 4:
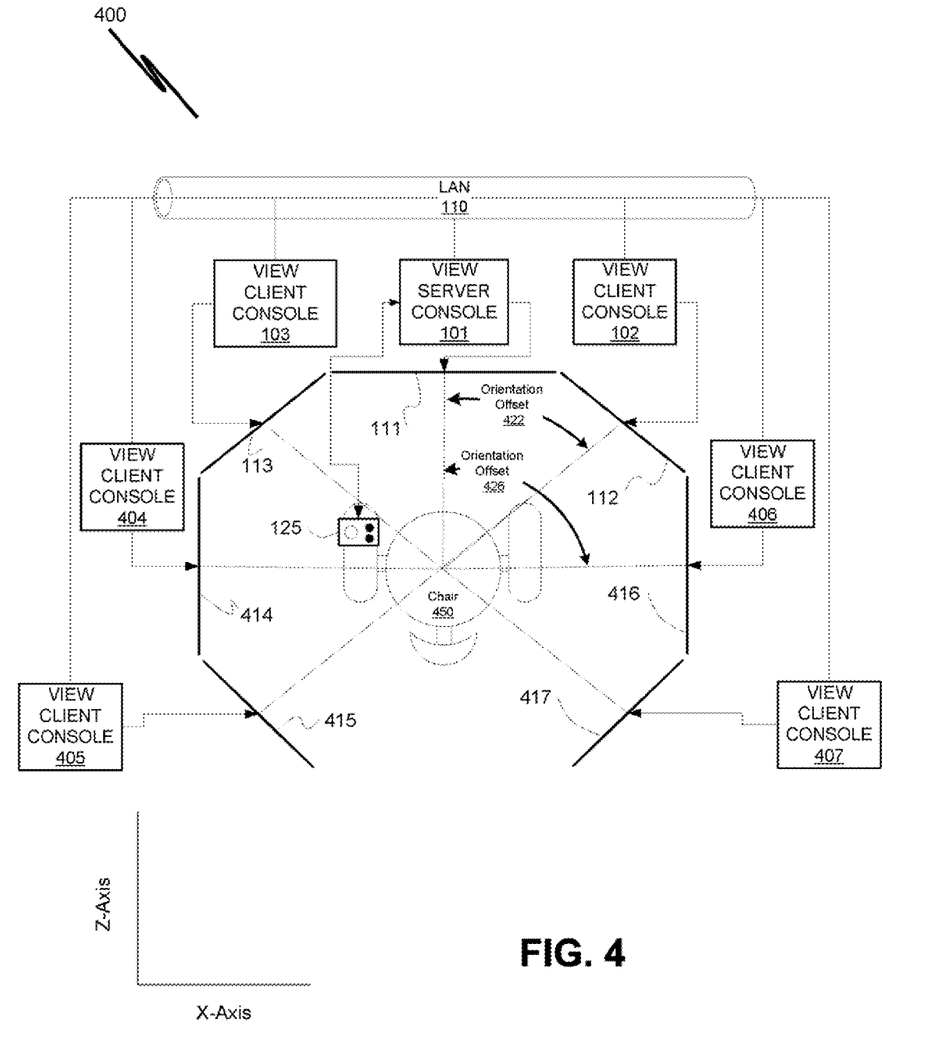
FIG. 4 illustrates a plan view of a multiple display graphics rendering system, in accordance with an embodiment of the present invention.

FIG. 4 illustrates a plan view of a multiple display graphics rendering system 400, in accordance with an embodiment of the present invention. As illustrated the system 400 includes all of the components of system 100 with the view client display device 112 rotated about the Y-axis of FIG. 2 and four view client display devices 414, 415, 416 and 417 added to nearly surround a user chair 450. Each of the view client displays is coupled to a view client console, 404, 405, 406 and 407 in substantially the same manner as described for system 100. As shown, each of the displays has a physical orientation with respect to the view server display device 111. For example, view client display device 112 is position relative to the view server display device 111 by a first physical orientation offset 422 and view client display device 416 is positioned relative the view server display device 111 by a second physical orientation offset 426. In a particular embodiment, each view client display device is positioned relative to the view server display device 111 by a fixed increment of between approximately 40 to 50 degrees such that the first physical orientation offset 422 is approximately 40 to 50 degrees and the second physical orientation offset 426 is approximately 80 to 100 degrees. Upon performing a graphics rendering method, such as method 200, each computing platform may render a view space modifying a server's view state with a view orientation offset value based on the physical orientation angle to collectively provide a nearly 360° FOV of a same world scene. Any number of display devices may be combined to provide up to a 360° FOV in any dimension.

Figure 5:
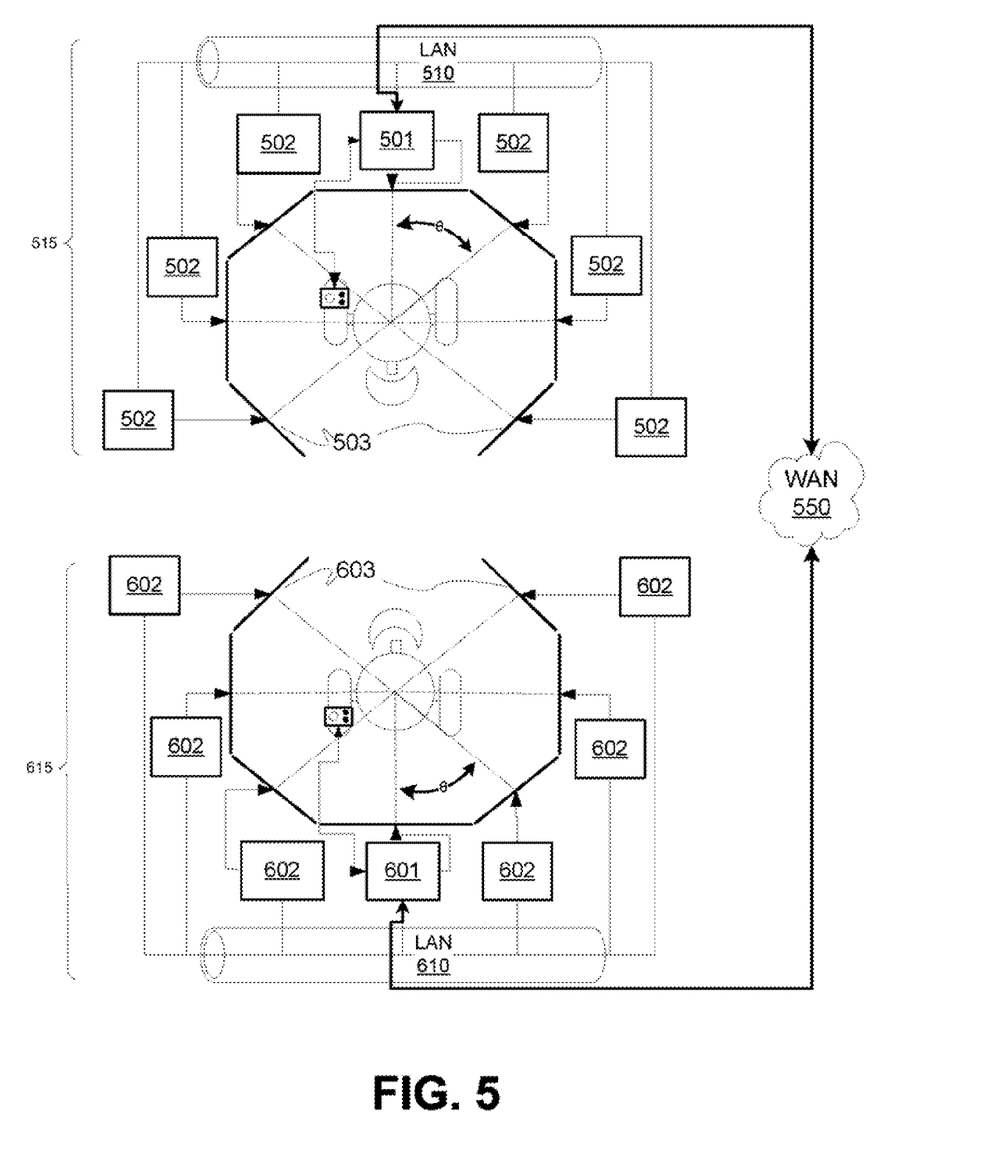
FIG. 5 shows a schematic diagram of a multi-system configuration, according to one embodiment of the present invention.

In an embodiment, a multiple display rendering system, such as system 400, may be networked with another multiple display rendering system. FIG. 5 shows a block diagram of two of multiple display graphics rendering systems, communicatively coupled together. In the depicted embodiment, the multiple display graphics rendering system 515, including a view server console 501 coupled over a LAN 510 to view client consoles 502 with each console further coupled to one of the display devices 503, is coupled to another system 615 similarly configured with a view server console 601 coupled over a LAN 610 to view client consoles 602 with each console further coupled to one of the display devices 603. The view server console 601 is further coupled to view server console 501 via a WAN 550 to allow communication between the server consoles.

In one such embodiment, an inter-system client-server relationship is established between the view server consoles 501 and 601 separate from the intra-system view client-server relationship established within systems 515 and 615. In an implementation, there need not be any inter-system interaction between the view client consoles 502 and the view client consoles 602. As such, the inter-system client-server relationship may be established using conventional one-to-one or one-to-many communication techniques whereby the only computing platform of a multiple display rendering system (e.g., system 515 or system 615) that is visible or active on the inter-system network is the computing platform acting as the system view server (e.g., server consoles 501 and 601). For example, conventional online gaming techniques may be employed whereby object position and animation information may be periodically communicated, using UDP transport for example, between the view server consoles 501 and 601 to allow a player using the multiple display graphics rendering system 515 to play a same game as is a player using the system 615. The inter-system refresh rates between the system view server consoles 501 and 601 may be relatively lower than the intra-system refresh rates within each system 515 and 615.

In an embodiment of networked multiple display rendering systems, all consoles (e.g., view server consoles 501, 601 and respective view client consoles 502 and 602) of the network execute the same application to generate and render graphics for a same world space. The display devices 503 display graphics rendered by the view server console 501 and view client consoles 502 from a first server camera at a first world position (e.g., first player position in a world space) with an orientation offset in the camera views displayed by each display device 503. The display devices 603 display graphics rendered by the view server console 601 and view client consoles 602 from a second server camera at a second world position (e.g., second player position in the world space) with an orientation offset in the camera views displayed by each display device 603.

Figure 6:
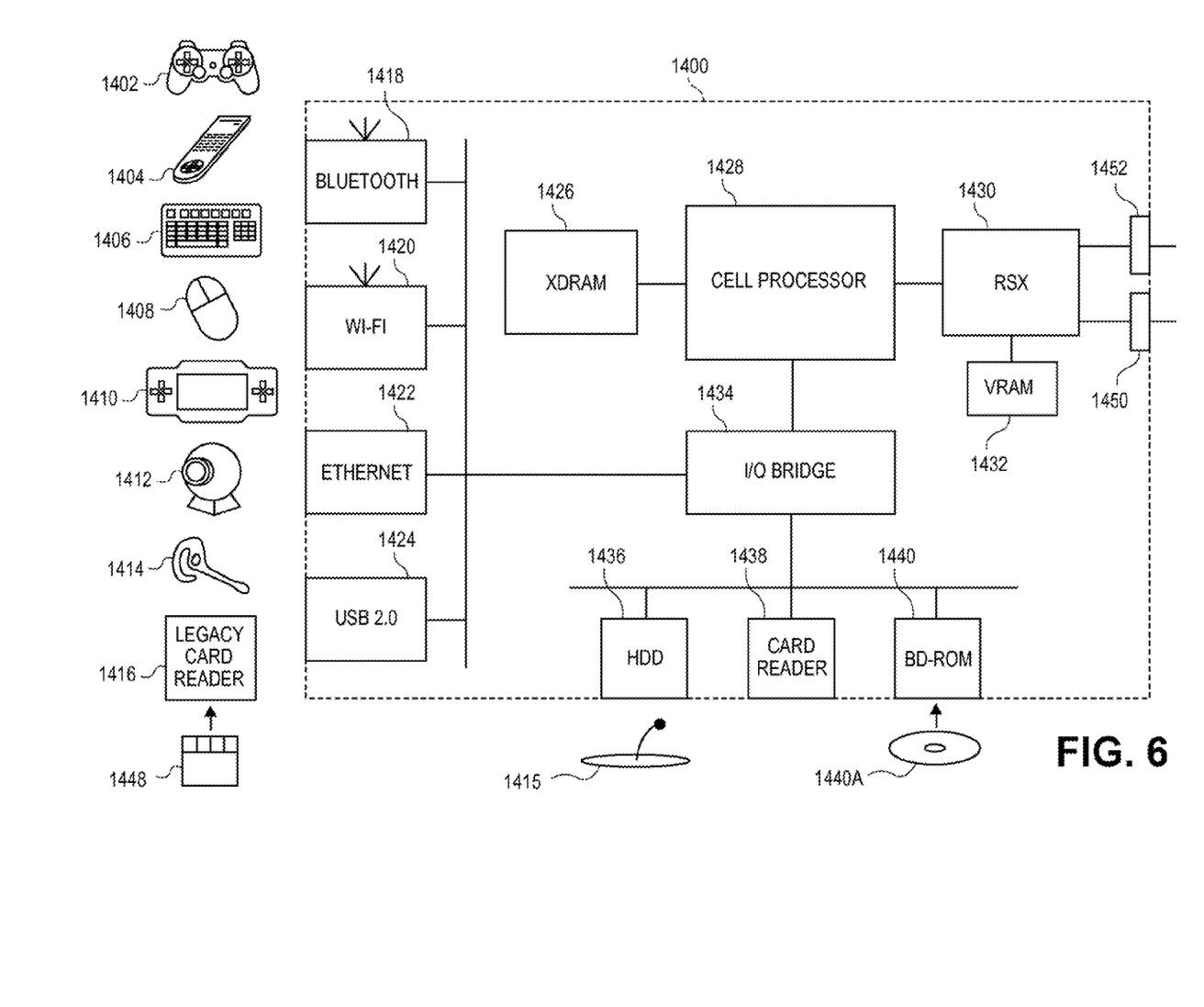
FIG. 6 illustrates hardware and user interfaces that may be used to generate and render an application camera view, in accordance with one embodiment of the present invention.

FIG. 6 illustrates hardware and user interfaces that may be used to generate and render an application camera view as a component of a multiple display graphics rendering system, in accordance with one embodiment of the present invention. FIG. 6 schematically illustrates the overall system architecture of the Sony® Playstation 3® entertainment device, a console that may be compatible for implementing multiple display graphics rendering system. A platform unit 1400 is provided, with various peripheral devices connectable to the platform unit 1400. The platform unit 1400 comprises: a Cell processor 1428; a Rambus® dynamic random access memory (XDRAM) unit 1426; a Reality Simulator graphics unit 1430 with a dedicated video random access memory (VRAM) unit 1432; and an I/O bridge 1434. The platform unit 1400 also comprises a Blu Ray® Disk BD-ROM® optical disk reader 1440 for reading from a disk 1440A and a removable slot-in hard disk drive (HDD) 1436, accessible through the I/O bridge 1434. Optionally the platform unit 1400 also comprises a memory card reader 1438 for reading compact flash memory cards, Memory Stick® memory cards and the like, which is similarly accessible through the I/O bridge 1434.

The I/O bridge 1434 also connects to multiple Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controller 1402. For example when a user is playing a game, the I/O bridge 1434 receives data from the game controller 1402 via a Bluetooth link and directs it to the Cell processor 1428, which updates the current state of the game accordingly.

The wireless, USB and Ethernet ports also provide connectivity for other peripheral devices in addition to game controller 1402, such as: a remote control 1404; a keyboard 1406; a mouse 1408; a portable entertainment device 1410 such as a Sony Playstation Portable® entertainment device; a video camera such as an EyeToy® video camera 1412; a microphone headset 1414; and a microphone 1415. Such peripheral devices may therefore in principle be connected to the platform unit 1400 wirelessly; for example the portable entertainment device 1410 may communicate via a Wi-Fi ad-hoc connection, while the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

The game controller 1402 is operable to communicate wirelessly with the platform unit 1400 via the Bluetooth link, or to be connected to a USB port, thereby also providing power by which to charge the battery of the game controller 1402. Game controller 1402 can also include memory, a processor, a memory card reader, permanent memory such as flash memory, light emitters such as LEDs or infrared lights, microphone and speaker for ultrasound communications, an acoustic chamber, a digital camera, an internal clock, a recognizable shape such as a spherical section facing the game console, and wireless communications using protocols such as Bluetooth®, WiFi™, etc.

Game controller 1402 is a controller designed to be used with two hands. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or the like.

The remote control 1404 is also operable to communicate wirelessly with the platform unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The platform unit 1400 is operable to supply audio and video, either generated or decoded by the Playstation 3 device via the Reality Synthesizer graphics unit 1430, through audio and video connectors to a display and sound output device such as a monitor or television set having a display and one or more loudspeakers. The audio connectors 1450 may include conventional analogue and digital outputs while the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the platform unit 1400. The camera LED indicator is arranged to illuminate in response to appropriate control data from the platform unit 1400, for example to signify adverse lighting conditions. Embodiments of the video camera 1412 may variously connect to the platform unit 1400 via a USB, Bluetooth or Wi-Fi communication port. Embodiments of the video camera may include one or more associated microphones and may also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, for successful data communication to occur with a peripheral device such as a video camera or remote control via one of the communication ports of the platform unit 1400, an appropriate piece of software such as a device driver should be provided. Device driver technology is well-known and will not be described in detail here, except to say that those skilled in the art are aware that a device driver or similar software interface may be required in the present embodiment described.

Figure 7:
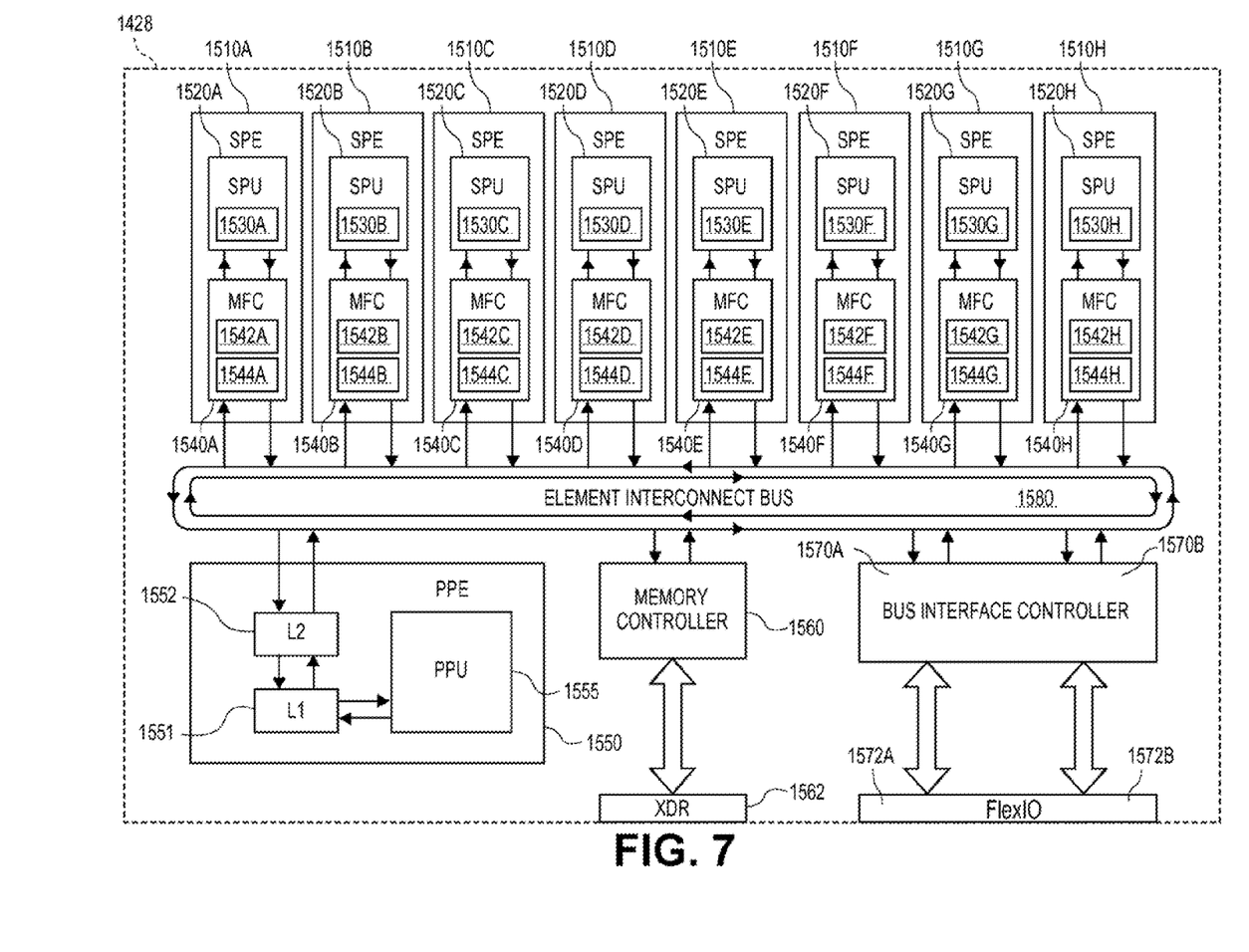
FIG. 7 illustrates additional hardware that may be used to process instructions, in accordance with one embodiment of the present invention.

FIG. 7 illustrates additional hardware that may be used to process instructions, in accordance with one embodiment of the present invention. Cell processor 1428 of FIG. 6 as further illustrated in FIG. 7 has an architecture comprising four basic components: external input and output structures comprising a memory controller 1560 and a dual bus interface controller 1570A, B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache 1552 and a 32 kB level 1 (L1) cache 1551. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RISC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface 1570A, B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM 1426 with a theoretical peak bandwidth of 25.6 GB/s.

The dual bus interface 1570A,B comprises a Rambus FlexIO® system interface 1572A, B. The interface is organized into 12 channels each being 8 bits wide, with five paths being inbound and seven outbound.

It is to be understood that the above description is intended to be illustrative, and not restrictive. For example, while the flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. A multiple display graphics rendering system, comprising:
    a server including a first display device and a first computing platform, the first computing platform to execute a first application that generates a world space and renders from the generated world space a first viewing frustum for display on the first display device, the first viewing frustum having an origin at a world space position of the application; and
    a client coupled to the server via a communication link, the client including a second display device and a second computing platform, the second computing platform to receive transmission of the world space position, to execute a second application that regenerates the world space and renders from the regenerated world space a second viewing frustum for display on the second display device, the second viewing frustum having an origin at the world space position with a orientation offset from the first viewing frustum, wherein, in response to the server being networked with the client, a field of view (FOV) of the first viewing frustum is reduced relative to the FOV when the first computing platform is operable in a stand-alone mode.

2. The system of claim 1, wherein the first and second applications are the same game or CAD application, wherein the first and second viewing frustums represent distinct portions of a same world-scene from the world space position and wherein the second viewing frustum does not overlap the first viewing frustum.

3. The system of claim 2, wherein the second display device has a physical orientation relative to the first display device, and wherein the orientation offset between the first viewing frustum and second viewing frustum is based on the second display device's relative physical orientation.

4. The system of claim 3, wherein the first viewing frustum has a field of view (FOV) between 20 and 50 degrees.

5. The system of claim 4, wherein the second viewing frustum has a FOV equal to that of the first viewing frustum and wherein the orientation offset between the first viewing frustum and second viewing frustum is less than twice the FOV.

6. The system of claim 5, wherein the second display device is physically oriented to the left of the first display device by between 40 and 50 degrees, the FOV is approximately 25 degrees, and the second camera view has an orientation offset from the first camera view by less than 50 degrees.

7. The system of claim 1, further comprising a plurality of additional clients, each client coupled to the server via a communication link, and each client including:
a client display device; and
a client computing platform to receive transmission of the world space position from the server, to execute a client application that generates a client viewing frustum having an origin at the world space position, each client view frustum with an orientation offset from the first viewing frustum by a different amount, and each client to render the client viewing frustum for display on the client display device.

8. The system of claim 7, wherein the plurality of additional clients include a third client with a third display device to the physically oriented left of the second display device, the third display device to display a third viewing frustum with a second orientation offset from the first viewing frustum by an amount greater than the orientation offset between the first and second viewing frustums.

9. The system of claim 7, wherein the server and plurality of clients generate an effective FOV greater than 120 degrees from the world space position.

10. The system of claim 1, wherein the first and second computing platforms are game consoles, wherein communication link is link in a local area network (LAN), and wherein the server communicates the world space position to all clients on the LAN with a broadcast message sent using an unreliable delivery protocol (UDP).

11. The system of claim 1, wherein only the first of the first and second computing platforms is coupled to a controller configured to control both the first and second viewing frustums.

12. A method of rendering graphics with multiple displays, the method comprising:
generating a world space with a first computing platform;
rendering a first viewing frustum from the generated world space, the first viewing frustum having an origin at a world space position and a world space orientation;
displaying the first viewing frustum on a first display device coupled to the first computing platform, wherein the first viewing frustum has a field of view (FOV) reduced relative to the FOV when the first computing platform is operable in a stand-alone mode;
transmitting the world space position and the world space orientation via a communication link to a second computing platform;
regenerating the world space on the second computing platform;
rendering a second viewing frustum from the regenerated world space, the second viewing frustum having an origin at the world space position and an orientation offset from the first viewing frustum; and
displaying on a second display device the second camera view.

13. The method as in claim 12, further comprising:
accessing configuration information stored on the second computing platform, the configuration information indicative of the orientation offset between the first viewing frustum and second viewing frustum; and
applying the orientation offset to the world space orientation to render the second viewing frustum from the regenerated world space.

14. The method as in claim 12, wherein the world space is generated with a game or CAD application executing on the first computing platform and wherein the world space is regenerated with a same game or CAD application executing on the second computing platform.

15. The method as in claim 14, further comprising:
scanning through the internal state of all world space objects generated by the application executing on the first computing platform; and
transmitting the internal states to the second computing platform.

16. The method as in claim 12, further comprising:
receiving a view control command to modify the world space position or a world space orientation;
re-rendering of the first viewing frustum in response to the received view control command; and
re-rendering the second viewing frustum in response to receiving the modified world space position or world space orientation via the communication link.

17. A non-transitory computer-readable medium having stored thereon a set of instructions which when executed cause a processing system to perform a method comprising:
generating a world space;
rendering a first viewing frustum from the generated world space, the first viewing frustum having an origin at a world space position received from a remote computing platform and the first viewing frustum angularly offset from a received world space orientation to provide a continuous field of view (FOV) with a display provided by the remote computing platform; and
displaying the first viewing frustum on a first display device, wherein the first viewing frustum has a FOV which overlaps a FOV provided by the remote computing platform when the remote computing platform is operated in a stand-alone mode.

18. The medium of claim 17, wherein the world space is generated based on object and animation information received from the remote computing platform.

19. The medium of claim 17 further including instructions for performing the method comprising:
accessing stored configuration information indicative of the angular offset between the first viewing frustum and a second viewing frustum rendered by the remote computing platform; and
applying the angular offset to the receive world space orientation to render the second viewing frustum from the regenerated world space.

20. The medium of claim 17, further including instructions which when executed cause the processing system to perform the method comprising:
re-rendering the first viewing frustum in response to receiving a modified world space position or world space orientation from the remote computing platform.

* * * * *